(12) United States Patent
Reinhardt

(10) Patent No.: US 8,967,994 B2
(45) Date of Patent: Mar. 3, 2015

(54) MOLD CLAMPING DEVICE

(75) Inventor: Thomas Reinhardt, Aying (DE)

(73) Assignee: KraussMaffei Technologies GmbH, München (DE)

( * ) Notice: Subject to any disclaimer, the term of this patent is extended or adjusted under 35 U.S.C. 154(b) by 8 days.

(21) Appl. No.: 13/984,469

(22) PCT Filed: Feb. 3, 2012

(86) PCT No.: PCT/EP2012/051857
§ 371 (c)(1),
(2), (4) Date: Aug. 8, 2013

(87) PCT Pub. No.: WO2012/110333
PCT Pub. Date: Aug. 23, 2012

(65) Prior Publication Data
US 2013/0344192 A1  Dec. 26, 2013

(30) Foreign Application Priority Data

Feb. 15, 2011 (DE) .......................... 10 2011 011 264

(51) Int. Cl.
| | |
|---|---|
| B29C 45/68 | (2006.01) |
| B29C 45/67 | (2006.01) |
| B29C 45/56 | (2006.01) |
| B29C 45/17 | (2006.01) |

(52) U.S. Cl.
CPC ............. *B29C 45/6714* (2013.01); *B29C 45/68* (2013.01); *B29C 45/561* (2013.01); *B29C 2045/1792* (2013.01)
USPC ............................. 425/589; 425/590; 425/595

(58) Field of Classification Search
CPC .............. B29C 45/68; B29C 2045/664; B29C 2045/686
USPC .......... 425/589, 590, 595, 450.1, 451.2, 451.9
See application file for complete search history.

(56) References Cited

U.S. PATENT DOCUMENTS

| | | | |
|---|---|---|---|
| 5,338,174 A * | 8/1994 | Miese et al. .................. | 425/589 |
| 6,851,942 B2 | 2/2005 | Wohlrab | |
| 6,932,924 B2 | 8/2005 | Nishizawa et al. | |
| 7,686,607 B2 | 3/2010 | Dantlgraber | |

FOREIGN PATENT DOCUMENTS

| | | |
|---|---|---|
| DE | 103 16 199 | 9/2011 |
| DE | 100 40 819 | 8/2012 |
| JP | H 3-45118 | 4/1991 |
| JP | 2004-042515 | 2/2004 |
| WO | WO 2005/118252 | 12/2005 |

OTHER PUBLICATIONS

International Search Report issued by the European Patent Office in International Application PCT/EP2012/052106 on May 16, 2012.

* cited by examiner

*Primary Examiner* — James Mackey
(74) *Attorney, Agent, or Firm* — Henry M. Feiereisen, LLC

(57) ABSTRACT

A mold clamping device for an injection-molding machine includes a fixed platen, a movable platen, pressure pads for generating a clamping force, and a spindle drive for moving the movable platen. The spindle drive has a non-rotating spindle shaft and a spindle nut which can be rotationally driven by a motor. The spindle shaft has a threaded portion in engagement with a matching thread of the spindle nut. To permit a free relative movement between the spindle drive and the movable platen, a piston-cylinder unit is in operative connection with the spindle drive and has on both sides of the piston pressure medium spaces, which can optionally be hydraulically blocked or connected to one another. In the latter state, the spindle drive is decoupled from the movable platen and freely floating with respect to it.

8 Claims, 2 Drawing Sheets

MOLD CLAMPING DEVICE

CROSS-REFERENCES TO RELATED APPLICATIONS

This application is the U.S. National Stage of International Application No. PCT/EP2012/051857, filed Feb. 3, 2012, which designated the United States and has been published as International Publication No. WO 2012/110333 and which claims the priority of German Patent Application, Serial No. 10 2011 011 264.2, filed Feb. 15, 2011, pursuant to 35 U.S.C. 119(a)-(d).

BACKGROUND OF THE INVENTION

The invention relates to a mold clamping device for an injection-molding machine.

From DE10040819A1 a 2-platen mold clamping device is known, in which for moving the movable platen a spindle drive is provided between the fixed platen and the movable platen. One end of each spindle shaft is mounted in the fixed platen and is constructed as a piston of a piston-cylinder unit which is able to be acted upon by a pressure medium. The spindle shafts therefore form at the same time the columns of the mold clamping device which are acted upon by clamping force. This is disadvantageous in so far as the spindle drive is exposed to high mechanical stresses during the build-up of clamping force.

DE10316199A1 discloses a 2-platen mold clamping device with a fixed and a movable platen, wherein an electromotive spindle drive is provided for moving the movable platen. An AC servomotor is fastened to the fixed platen, the drive shaft of which motor is coupled with a spindle shaft. The end of the drive spindle facing the AC servomotor is mounted rotatably in a bearing in the fixed platen. The end of the spindle shaft facing away from the AC servomotor is guided through a spindle nut which is connected in a torque-proof manner with the movable platen. The spindle shaft can be rotated by means of the AC servomotor. Via the spindle nut, the rotational movement of the spindle shaft is converted into a linear movement of the movable platen. Furthermore, four pressure pads are provided on the fixed platen for the generation of the clamping force. Owing to the rigid mechanical coupling of the spindle drive between the two platens, however, no injection-compression molding methods can be carried out with the pressure pads.

SUMMARY OF THE INVENTION

Proceeding from this prior art, the invention is based on the problem of indicating a generic mold clamping device with a spindle drive, by which injection-compression molding methods can also be carried out.

The problem is solved by a mold clamping unit having a fixed platen, a movable platen, one or more pressure pads for generating a clamping force, and at least one spindle drive for moving the movable platen, the spindle drive including a non-rotating spindle shaft and a spindle nut which can be rotationally driven by a motor, with the spindle shaft having a threaded portion which is in engagement with a matching thread of the spindle nut, and a piston-cylinder unit which is in operative connection with the spindle drive, wherein on both sides of the piston of the piston-cylinder unit pressure medium spaces are present, which can optionally be hydraulically blocked or connected to one another.

Advantageous embodiments and further developments are to be found in the subclaims.

Through the fact that a piston-cylinder unit is provided which is in operative connection with the spindle drive, and pressure medium spaces are present on both sides of the piston, which can optionally be hydraulically blocked or connected to one another, the spindle drive can be optionally connected rigidly with the movable platen or decoupled therefrom or respectively be freely floating. When the pressure medium spaces are hydraulically blocked, this corresponds as a result to the hitherto known rigid mechanical coupling or connection between spindle drive and movable platen. When, on the other hand, the pressure medium spaces are connected to one another, the spindle drive is uncoupled from the movable platen and namely in the sense that in axial direction a relative movement is possible between the movable platen and the spindle drive. The movable platen and the spindle drive are freely floating with respect to one another. In this state, injection-compression molding methods can be carried out, in which the movable platen is to be moved through predeterminable compression paths and namely independently or respectively dissociated from the moving drive of the movable platen, i.e. independently or respectively dissociated from the spindle drive.

In addition, also in standard injection molding, i.e. when no compression paths are travelled, generally a movement of the movable platen always occurs during the build-up of clamping force. Through the decoupling of the spindle drive from the movable platen, the releasing of the spindle drive during the build-up of clamping force can therefore be dispensed with, i.e. permitting a free movement of the spindle nut with respect to the spindle. If, however, such a releasing is provided during the build-up of clamping force per se, a damaging of the spindle drive does not occur if this releasing does not take place for any reason.

In a first embodiment, the spindle nut can be provided on the movable platen and the piston-cylinder unit can be provided on the fixed platen. In this embodiment, the spindle shaft has a portion which is coupled with the piston of the piston-cylinder unit, wherein pressure medium spaces are formed on both sides of the piston, which can optionally be hydraulically blocked or connected to one another. Thereby, the movable platen can be placed freely floating with respect to the fixed platen when the pressure medium spaces are connected to one another. In this state, the spindle drive is not exposed to any mechanical stresses at all during the build-up of clamping force. The spindle shaft is released and can—together with the movable platen—move freely in the cylinder of the piston-cylinder unit. In particular in this state injection-compression molding functions can be carried out, in which the movable platen is to be moved through a compression path with respect to the fixed platen. By means of the pressure pads, compression paths can therefore be travelled, wherein the spindle shaft is co-moved in a freely floating manner in the cylinder of the piston-cylinder unit, without it being exposed to appreciable mechanical stresses.

For the phase of the moving of the movable platen, the pressure medium spaces are hydraulically blocked, so that in this phase the spindle shaft together with the piston of the piston-cylinder unit forms a rigid continuous connection between the fixed platen and the movable platen. By actuation of the spindle drive, in this phase the movable platen can be moved relative to the fixed platen.

As an anti-twist protection for the spindle shaft, the spindle shaft can have a portion with a toothing, which is in engagement with a housing with a matching toothing. In particular, a tooth hub can be provided on the fixed platen as anti-twist protection for the spindle shaft.

In a second embodiment, both the spindle nut and also the piston-cylinder unit can be provided on the movable platen. The cylinder of the piston-cylinder unit is fastened here on the movable platen and the spindle shaft is fastened on the fixed platen in a torque-proof manner and non-displaceably in axial direction. Furthermore, provision is made that the spindle shaft is guided through a sleeve which is torque-proof with respect to the movable platen, and which is securely connected with the piston of the piston-cylinder unit and with the motor. The sleeve can be formed here in one part or respectively from one piece. However, it can also be composed of several suitable sections.

In a preferred embodiment, the piston-cylinder unit is embodied as a synchronous cylinder. This has the advantage that no pressure medium has to be supplied or conveyed away when the pressure medium spaces are connected to one another. On moving of the piston, pressure medium is merely displaced or diverted from the reducing pressure medium space into the enlarging pressure medium space.

Each spindle shaft can have its own motor allocated to it. However, several spindle shafts can also be actuated by a shared motor, for example via a suitable belt drive.

2-platen mold clamping devices are a preferred field of application. The invention is, however, also able to be used in 3-platen mold clamping arrangements, in which for moving the movable platen a spindle drive is provided. It is important merely that a releasing of the spindle drive with respect to the movable platen is provided.

BRIEF DESCRIPTION OF THE DRAWING

The invention is to be described in further detail below with the aid of example embodiments and with reference to FIGS. 1 and 2 wherein.

DETAILED DESCRIPTION OF PREFERRED EMBODIMENTS

Figure 1:
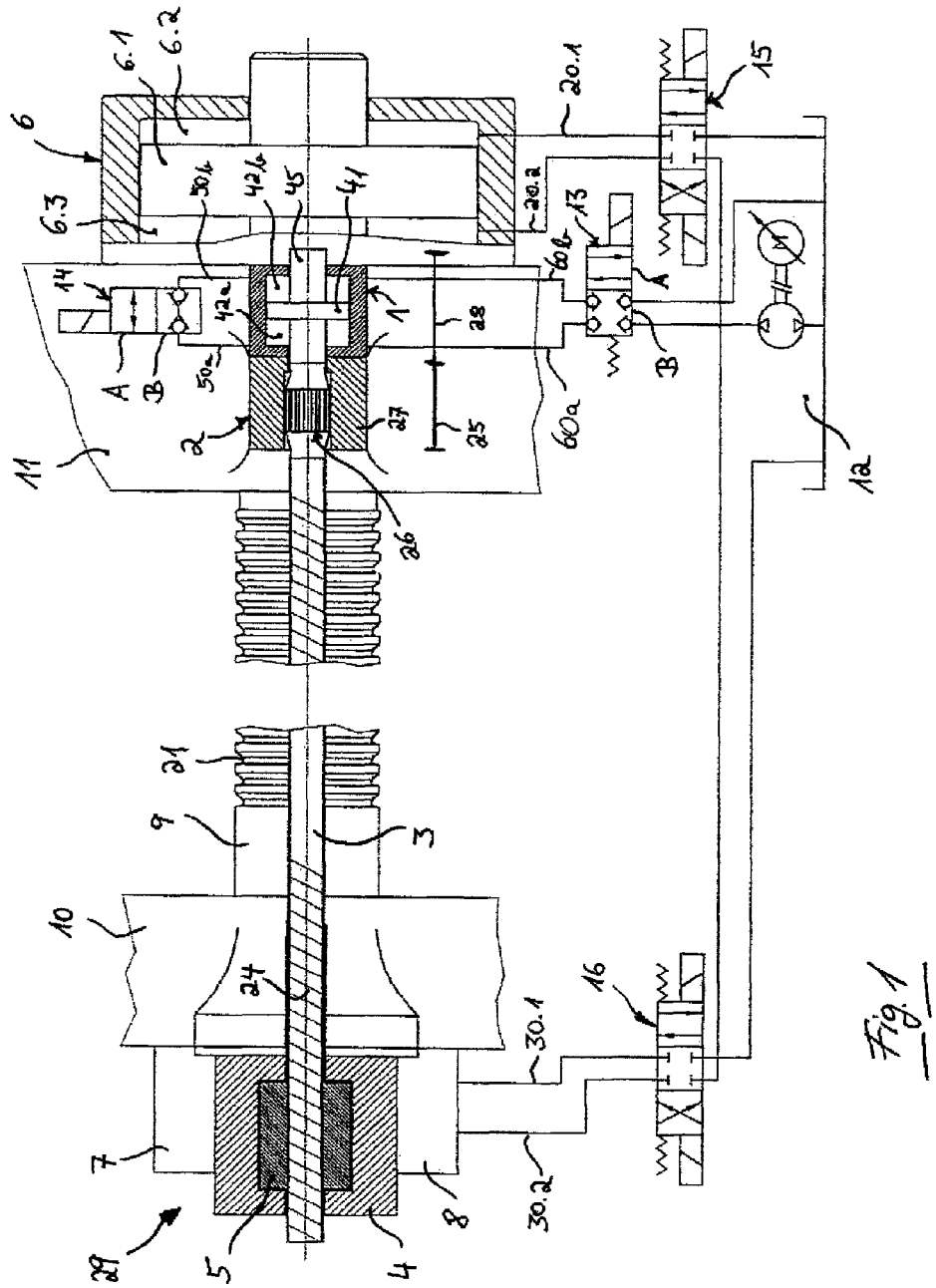
FIG. 1 is a partly sectional cutaway view of one embodiment of a 2-platen mold clamping device.

FIG. 1 shows a cutout of a 2-platen mold clamping device with a fixed platen 11 and a movable platen 10. Columns 9, generally four in number, are provided between the two platens, which columns are positioned in the corner regions of the platens. The columns 9 penetrate the fixed platen 11 and are provided, at their end projecting over the fixed platen, with a pressure pad 6. The column 9 is connected with the piston 6.1 of the pressure pad 6 and two pressure medium spaces 6.2 and 6.3 are formed, which can be acted upon by a pressure medium from a hydraulic unit 12 via pressure lines 20.1 and 20.2 and with the interposition of a control valve 15, for example in the embodiment as a 4/3-way valve. Locking elements 7 are provided on the movable platen, which locking elements can be moved in and out by means of a hydraulic drive 8 in grooves 21 of the column 9. In the retracted state a locked state of the mold clamping device is formed and in the extended state an unlocked state of the mold clamping device is formed. To actuate the hydraulic drive 8, the latter is connected with the hydraulic unit 12 via pressure medium lines 30.1 and 30.2 and a control valve 16, for example in the embodiment as a 4/3-way valve.

For moving the movable platen 10, a spindle drive is provided at the same height as the column 9 and therefore illustrated situated in front of the column 9 in FIG. 1. This spindle drive comprises an electric motor 4, mounted on the movable platen 10, the rotor of which is coupled with a spindle nut 5 or the rotor of which is constructed as spindle nut 5. The spindle nut 5 which can be rotationally driven by the electric motor 4 has a thread which is in engagement with a thread 24 of a spindle shaft 3. The spindle shaft 3 has a portion 25 which is provided with an outer toothing 26, which is in engagement with a matching inner toothing of a housing 27. For example, the housing 27 can be constructed as a tooth hub 2. The housing 27 or respectively the tooth hub 2 on the one hand and the portion 25 of the spindle shaft 3 on the other hand form together an anti-twist protection of the spindle shaft 3. In extension of the portion 25, a portion 28 of the spindle shaft 3 adjoins which is coupled with the piston 41 of a piston-cylinder unit 1, so that pressure medium spaces 42*a* and 42*b* are formed on both sides of the piston 41. In the preferred embodiment illustrated here, the piston-cylinder unit is constructed as a synchronous cylinder 1. The portion 28 of the spindle shaft 3 forms a piston rod 45 which has the same diameter on both sides of the piston 41, so that the circular ring areas of the piston 41, which are acted upon by the pressure medium, have the same area on both sides of the piston. The portions 25 and 28 can be an integral component of the spindle shaft 3. They can also, however, be embodied as separate components which are connected with one another and with the spindle shaft 3, so that the spindle shaft 3, the portion 25 and the piston rod 45 form a structural unit.

A first control valve 14 in the embodiment of a 2/2-way valve is connected via pressure lines 50*a* and 50*b* with the pressure medium spaces 42*a* and 42*b* of the synchronous cylinder 1. Furthermore, a second valve 13 in the embodiment of a 4/2-way valve is connected via pressure medium lines 60*a* and 60*b* with the pressure medium spaces 42*a* and 42*b* of the synchronous cylinder 1. The 4/2-way valve 13 serves merely for flushing and venting the synchronous cylinder 1 and namely in cooperation with the control valve 14. On flushing and venting, the valves 13 and 14 are situated respectively in the switching position A. During the operation of the mold clamping unit the 4/2-way valve 13 is situated permanently in the switching position B.

During the operation of the mold clamping unit, the enabling and blocking of the axial movement of the spindle shaft 3 in the direction of its longitudinal axis takes place exclusively via the control valve 14. In the switching position A the control valve 14 is switched to free-running. The pressure medium spaces 42*a* and 42*b* are connected via the pressure medium lines 50*a* and 50*b*. In this switching position the axial movement of the spindle shaft 3 is enabled. In the switching position B the control valve 14 is switched in blocking position and the pressure medium spaces 42*a* and 42*b* are hydraulically blocked. In this switching position, the axial movement of the spindle shaft 3 is blocked.

For the opening and closing movement of the mold clamping device, i.e. for moving the movable platen 10, the two pressure medium spaces 42*a* and 42*b* of the synchronous cylinder 1 are hydraulically blocked. For this, the control valve 14 is brought into the switching position B. On an actuation of the electric motor 4, the spindle nut 5 is rotated. This rotary movement is converted into a linear movement of the movable platen 10 along the spindle shaft 3 which is mounted in a torque-proof manner and hydraulically blocked in longitudinal direction. The synchronous cylinder 1 is released during the build-up of clamping force and if applicable also during the decrease of clamping force and the generation of the opening force. The control valve 14 is situated here in the switching position A, i.e. the pressure medium spaces 42*a* and 42*b* are connected to one another.

Furthermore, the releasing of the synchronous cylinder 1 permits the carrying out of injection-compression molding functions by means of the pressure pads 6. Such injection-compression molding functions are distinguished in that the movable platen 10 is moved by means of the pressure pads 6 relative to the fixed platen through particular compression paths and namely with the maintaining of particular clamping forces. Injection-compression molding functions are known in diverse variants from the prior art and therefore do not need to be explained here in further detail. Suitable tools for injection-compression molding functions are merely to be provided, which enable an enlarging or reducing in size of the cavity when the movable platen and the movable mold half mounted onto it is moved relative to the fixed platen and the fixed mold half mounted thereon. In the carrying out of the injection-compression molding functions, the electric motors 4 are generally switched off or are blocked such that no rotation of the spindle nut 5 takes place. On moving of the movable platen 10 through a compression path by means of the pressure pads 6 therefore the spindle shaft 3, sitting in the spindle nut 4 and held in a torque-proof manner with the tooth hub 2, is freely co-moved in the synchronous cylinder 1. The movable platen 10 is therefore freely floating when the synchronous cylinder 1 is released.

Figure 2:
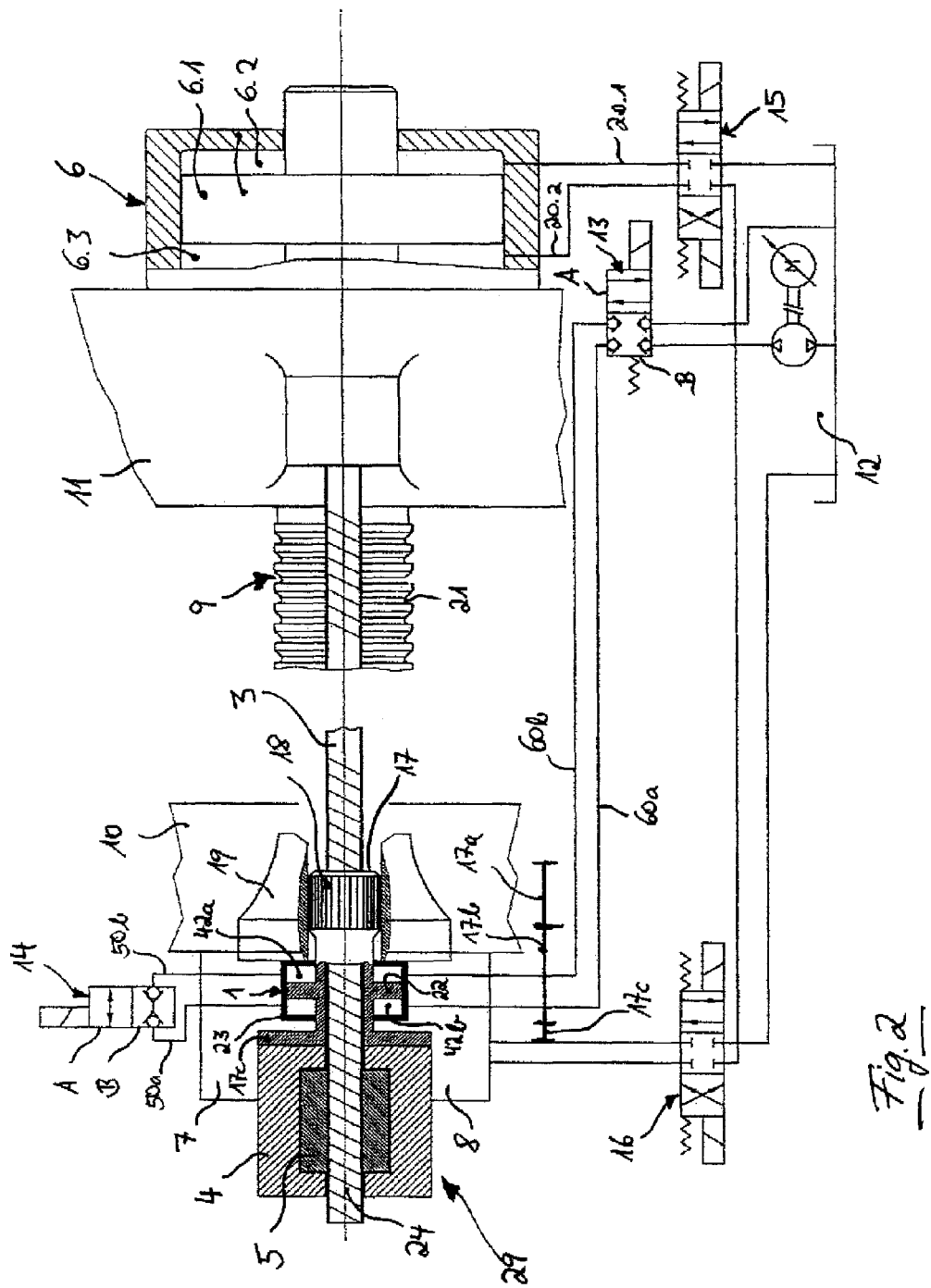
FIG. 2 is a partly sectional cutaway view of another embodiment of a 2-platen mold clamping device.

An alternative embodiment is shown in FIG. 2. The essential difference compared with the embodiment of FIG. 1 lies in the arrangement of the synchronous cylinder 1. In contrast to FIG. 1, the synchronous cylinder 1 is now provided on the movable platen 10. The spindle shaft 3 is fastened in the fixed platen 11 by its one end in a torque-proof manner and non-displaceably in axial direction. To support and transfer the torque generated by the electric motor 4, a sleeve 17 with an outer toothing 18 is provided in a holding element 19 with a matching inner toothing. The sleeve 17 is illustrated partially in section. It can thereby be seen that in addition to the portion 17a with the outer toothing, the sleeve 17 has a portion 17b which extends through the cylinder 23 of the synchronous cylinder 1 and terminates in a flange portion 17c. In the cylinder 23, the portion 17b of the sleeve is provided with a piston 22. The synchronous cylinder 1 or respectively the cylinder 23 is fastened to the movable platen 10, for example on the holding element 19. The electric motor 4 is fastened to the flange portion 17c of the sleeve 17. The spindle shaft 3 is guided through the sleeve 17 and with its threaded portion 24 is in engagement with a matching thread of the spindle nut 5.

The mode of operation of the mold clamping device according to FIG. 2 is as follows. During the moving of the movable platen 10, the synchronous cylinder 1 is hydraulically blocked. The control valve 14 is situated in the switching position B. The spindle nut 5 is rotationally driven during the operation of the electric motor 4. Consequently, the unit of electric motor 4, sleeve 17 and synchronous cylinder 1 together with the movable platen 10 is moved along the spindle shaft 3 towards or away from the fixed platen 11, according to the rotation direction of the spindle nut 5. When the clamping unit is closed and locked, clamping force can be built up. Likewise, injection-compression molding functions can be carried out as described above. For this, the synchronous cylinder 1 is released. The control valve 14 is now situated in the switching position A. When the pressure pads 6 are actuated and a displacement of the columns 9 brings about a displacement of the movable platen 10, the following takes place. The position of spindle shaft 3, sleeve 17, spindle nut 5 and electric motor 4 is fixed, namely on the one hand in a torque-proof manner via the sleeve 17 and on the other hand in an axially fixed manner via the spindle shaft 3 which is fastened in the fixed platen 11. The movable platen 10 can move nevertheless freely with respect to the above-mentioned fixed components of the spindle drive, because the synchronous cylinder 1 is enabled (switching position A of the control valve 14). Thereby, the cylinder 23 can move freely relative to the piston 22 and the remaining components of the spindle drive. A movement of the movable platen 10 is therefore not transferred to the spindle drive. The movable platen 10 is freely floating with respect to the spindle drive.

Usually, two spindle drives are arranged diagonally to one another for moving the movable platen 10.

Clearly, fewer quantities of oil are required, in contrast to a purely hydraulic mold clamping unit with a hydraulic travel drive of the movable platen. Thereby, if applicable, a cooling of the hydraulic fluid can also be dispensed with.

What is claimed is:

1. A mold clamping device for an injection-molding machine, comprising:
   a fixed platen;
   a movable platen;
   one or more pressure pads for generating a clamping force;
   at least one spindle drive for moving the movable platen in relation to the fixed platen, said spindle drive including a spindle nut, a motor for rotating the spindle nut, and a non-rotating spindle shaft having a threaded portion in engagement with a matching thread of the spindle nut; and
   a piston-cylinder unit operably connected with the spindle drive and having a piston and pressure medium spaces formed on both sides of the piston and selectively hydraulically blocked or connected to one another.

2. The mold clamping device of claim 1, wherein the spindle nut is provided on the movable platen and the piston-cylinder unit is provided on the fixed platen, said spindle shaft having a portion which is coupled with the piston of the piston-cylinder unit.

3. The mold clamping device of claim 1, wherein the spindle nut and the piston-cylinder unit are provided on the movable platen, said piston-cylinder unit having a cylinder which is fastened on the movable platen, said spindle shaft being fastened on the fixed platen in a torque-proof manner and non-displaceably in an axial direction, and further comprising a sleeve for passage of the spindle shaft, said sleeve being torque-proof with respect to the movable platen and securely connected with the piston of the piston-cylinder unit and with the motor.

4. The mold clamping device of claim 1, wherein the piston-cylinder unit is constructed as a synchronous cylinder.

5. The mold clamping device of claim 1, wherein the spindle drive has a plurality of said spindle shaft and a plurality of said motor placed in one-to-one correspondence with the spindle shafts.

6. The mold clamping device of claim 1, wherein the pressure pads for generating the clamping force are constructed for carrying out an injection-compression molding function, each said pressure pad having a piston which is movable in the pressure pad over a predeterminable compression path.

7. The mold clamping device of claim 1, further comprising a 2/2-way valve connected via pressure medium lines with the pressure medium spaces of the piston-cylinder unit and configured to hydraulically block the pressure medium spaces in one switching position and to hydraulically connect the pressure medium spaces to one another in another switching position.

8. The mold clamping device of claim 1, further comprising columns extending between the fixed and movable platens and adapted to receive a clamping force.

\* \* \* \* \*